(12) United States Patent
Westerkamp et al.

(10) Patent No.: US 10,397,020 B2
(45) Date of Patent: Aug. 27, 2019

(54) AUTOMATIC ADJUSTMENT OF THE MAXIMUM TOKEN HOLDING TIME IN BACNET MS/TP BUS SYSTEMS AT RUNTIME

(71) Applicant: WAGO Verwaltungsgesellschaft mbH, Minden (DE)

(72) Inventors: Georg Westerkamp, Garrel (DE); Lars Friedrich, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 174 days.

(21) Appl. No.: 15/479,535

(22) Filed: Apr. 5, 2017

(65) Prior Publication Data
US 2017/0288900 A1  Oct. 5, 2017

(30) Foreign Application Priority Data
Apr. 5, 2016 (DE) ........................ 10 2016 004 105

(51) Int. Cl.
*H04L 12/417* (2006.01)
*H04L 12/28* (2006.01)
*H04L 12/26* (2006.01)
*H04L 12/40* (2006.01)

(52) U.S. Cl.
CPC ............ *H04L 12/417* (2013.01); *H04L 12/28* (2013.01); *H04L 43/0876* (2013.01); *H04L 2012/4026* (2013.01)

(58) Field of Classification Search
None
See application file for complete search history.

(56) References Cited

U.S. PATENT DOCUMENTS

| 4,930,121 A * | 5/1990 | Shiobara | H04L 12/417 370/451 |
|---|---|---|---|
| 5,253,252 A * | 10/1993 | Tobol | H04L 12/417 370/452 |
| 2009/0006611 A1* | 1/2009 | Hong | H04L 12/2816 709/224 |
| 2009/0055765 A1* | 2/2009 | Donaldson | G05B 19/042 715/771 |
| 2009/0287736 A1* | 11/2009 | Shike | H04L 12/417 |
| 2009/0312853 A1* | 12/2009 | Kore | G05B 19/4185 700/90 |
| 2013/0086195 A1* | 4/2013 | Hiniker | H04L 12/2836 709/208 |
| 2016/0182693 A1* | 6/2016 | Ferguson | H04L 12/1868 709/217 |
| 2018/0109398 A1* | 4/2018 | Zotti | H04L 12/413 |

* cited by examiner

*Primary Examiner* — Duc T Duong
(74) *Attorney, Agent, or Firm* — Muncy, Geissler, Olds & Lowe, P.C.

(57) ABSTRACT

A method for the automatic adjustment of a maximum token holding time of a first bus participant in a BACnet MS/TP bus system. The method includes analyzing the data traffic in the bus system during a first time interval and adjusting a maximum token holding time of the first bus participant based on the analysis of the data traffic during the first time interval, whereby the analysis of the data traffic during the first time interval includes determining a data transmission pattern of a second bus participant, whereby the data transmission pattern of the second bus participant is defined by a measured data volume of the second bus participant and its distribution over time.

10 Claims, 4 Drawing Sheets

AUTOMATIC ADJUSTMENT OF THE MAXIMUM TOKEN HOLDING TIME IN BACNET MS/TP BUS SYSTEMS AT RUNTIME

This nonprovisional application claims priority under 35 U.S.C. § 119(a) to German Patent Application No. 10 2016 004 105.6, which was filed in Germany on Apr. 5, 2016, and which is herein incorporated by reference.

BACKGROUND OF THE INVENTION

Field of the Invention

The present invention relates to the field of bus systems. The present invention relates in particular to the field of the automatic adjustment of the maximum token holding time in BACnet (Building Automation and Control Networks) MS/TP (Master-Slave/Token-Passing) bus systems at runtime.

Description of the Background Art

In bus systems, such as the BACnet MS/TP bus system, all bus participants access the same physical resource, i.e., the same wire lines. To be able to transmit data via said wire lines (also called the "bus line" or "bus" below) without interference and without complex decoding, it is advantageous to assure that at each point in time only one of the bus participants accesses the bus, i.e., changes the voltage level of the signal-carrying wire line(s).

To prevent parallel accesses to the bus, BACnet MS/TP uses a so-called token, i.e., a message transmitted electronically via the bus, which is passed (retransmitted) from "master" bus participant (master) to master, whereby each bus participant may access the bus on its own accord only when it has the token, i.e., has received the token without having to pass it on for its part, or replies to a message of the token holder. The passing of the token occurs address-based (MAC address), whereby the master that holds the token passes it typically to the master with the master address (address in an address range reserved for the master) that is the next higher address known to it as assigned, whereby addresses that have not been assigned are skipped.

As soon as a master has sent all messages pending to be transmitted, it passes the token. So as to prevent a master from permanently blocking the bus system, each master at startup is configured with a parameter ("MAX_INFO_FRAMES"), which specifies for how long at most the master may hold the token (called the maximum token holding time hereinafter) before it must pass it on. The skillful selection of the maximum token holding time often poses a challenge for the startup engineer, however, as it requires detailed knowledge about the (useful) data traffic to be expected in the bus system.

SUMMARY OF THE INVENTION

It is therefore an object of the present invention to provide a method for the automatic adjustment of a maximum token holding time of a bus participant in a BACnet MS/TP bus system and one or more devices configured to carry out the method, i.e., one or more bus participants configured to carry out the method.

The method of the invention for the automatic adjustment of the maximum token holding time of a first bus participant in the BACnet MS/TP bus system comprises analyzing, by the first bus participant, data traffic in the bus system during a first time interval and adjusting, by the first bus participant, the maximum token holding time of the first bus participant based on the analysis of the data traffic during the first time interval, whereby the analysis of the data traffic during the first time interval comprises determining a data transmission pattern of a second bus participant, whereby the data transmission pattern of the second bus participant is defined by a measured data transmission volume of the second bus participant and its distribution over time.

The analysis of data traffic in the bus system during a first time interval in this case comprises in particular the determination of a sender address for messages sent via the bus, one or more transmission time points, and a particular message length. Further, the first time interval can comprise in particular one or more token rotations or part of a token rotation, for example, in that the first time interval begins with the passing of the token by the first bus participant and ends when the first bus participant again receives the token. Further, the second bus participant can be in particular a bus participant different from the first bus participant. The analysis of the data traffic in the bus system at runtime makes it possible to determine a data transmission pattern of the second bus participant and optionally further second (and thereby overall a plurality of second) bus participants, for example, by determining a bus participant functionality, which gives reason to expect a specific data transmission pattern. For example, it can be determined by analyzing the data traffic that the second bus participant is a monitoring unit, which based on its functionality sends status messages within specified intervals. Furthermore, a data transmission pattern of the second bus participant can be determined by filtering the data traffic during the first time interval by data that were transmitted from the second bus participant and by determining a cyclic behavior of the second bus participant. Thus, for example, for a control device, cyclically querying sensor data from a sensor and cyclically transmitting control data to an actuator, a data transmission pattern can be determined that comprises the cycle time of the sensor data query and the cycle time of the control data transmission. It can likewise be determined that the data transmission pattern of the second bus participant is characterized by long phases of minor or no (useful) data transmission activity, which are interrupted by short phases of high data transmission activity, such as, for example, a router which enables configuration access or updating access to the bus participant.

The analysis of the data traffic during the first time interval, furthermore, comprises determining a maximum send buffer usage of the first bus participant during the first time interval, determining whether the determined maximum send buffer usage of the first bus participant during the first time interval exceeds a predefined threshold value, and, if the determined maximum send buffer usage of the first bus participant exceeds a predefined threshold value, increasing the maximum token holding time of the first bus participant, whereby the extent of the increase is determined as a function of the data transmission pattern of the second bus participant.

If the maximum send buffer usage of the first bus participant during the first time interval exceeds a predefined threshold value, for example, if during the first time interval a send buffer usage of a communication module of the first bus participant of more than 80% or more than 90% occurs, it can be desirable to increase the maximum token holding time so as to enable the first bus participant to send more data via the bus and thereby to reduce the amount of data present in the send buffer. To prevent that an increase in the maximum token holding time of the first bus participant reduces the data transmission rate of the second bus participant to an undesirably great extent, the data transmission pattern of the second bus participant can be analyzed to this end so as to estimate how greatly the data transmission rate of the second bus participant is reduced by an increase in the maximum token holding time of the first bus participant, and the extent of the increase in the maximum token holding time of the first bus participant, based thereupon, can be selected or adjusted accordingly.

If the second bus participant transmits, for example, only in every second, third, fourth, fifth, or n-th token rotation (with n being greater than 5), it can be assumed that a lengthening of the token rotations and thereby a reduction in the number of token rotations per unit time have less of an unequal effect on the data transmission rate of the second bus participant than if it would transmit in each token rotation. It is understood, moreover, that even if reference was made to one second bus participant in the above text, the maximum token holding time of the first bus participant can be increased as a function of the data transmission pattern of a plurality of second bus participants. Alternatively, the second bus participant can be selected from the plurality of second bus participants, whereby the selected second bus participant can be the second bus participant of the plurality of second bus participants that has the highest data rate.

In addition to the analysis of the data traffic during the first time interval and the adjustment, based thereupon, of the maximum token holding time, the method comprises determining whether a third bus participant was added to the bus system and, if a third bus participant was added to the bus system, reducing the maximum token holding time of the first bus participant, whereby the extent of the reduction in the maximum token holding time is based on an analysis of the data traffic during a second time interval, whereby the analysis of the data traffic during the second time interval comprises determining a data transmission pattern of the third bus participant and the data transmission pattern of the third bus participant is defined by a measured data transmission volume of the third bus participant and its distribution over time.

It can be achieved by reducing the maximum token holding time of the first bus participant that the average and/or maximum token rotation time is not excessively increased by the addition of the third bus participant. Similarly, when the third bus participant leaves the bus system, the maximum token holding time of the first bus participant can be increased again.

The analysis of the data traffic during the second time interval comprises measuring a token rotation time and determining whether the measured token rotation time exceeds a threshold value, whereby the extent of reduction is based further on whether the measured token rotation time exceeds the threshold value.

It can be achieved in this case by reducing the maximum token holding time of the first bus participant that the token rotation time no longer exceeds the threshold value. This can be advantageous in particular if bus participants regularly send/receive status or control messages, and in the case of an untimely arrival of the status or control messages a desired functionality, implemented by a bus participant, is no longer available, for example, if the untimely arrival of the status or control messages of a bus participant causes a timeout.

The analysis of the data traffic during the second time interval comprises determining a transmission portion of the first bus participant at the measured token rotation time and determining whether the transmission portion of the first bus participant has exceeded a predefined threshold value, whereby the extent of the reduction is based further on whether the transmission portion of the first bus participant has exceeded the predefined threshold value.

It can be achieved by the inclusion of the transmission portions in particular that bus participants with disproportionately great transmission portions in particular reduce their token holding time, whereas bus participants with suitable transmission portions can retain their token holding time. It can be provided, for example, that only the bus participant with the greatest transmission portion reduces its token holding time. This can be useful in particular when the bus participant with the greatest transmission portion sends, among others, lower priority data packets, which can be sent in a delayed manner without adversely affecting the functionality of the bus participant.

A device of the invention, for example, the first bus participant, comprises a BACnet MS/TP-compatible interface and a communication module for transmitting and receiving data via the BACnet MS/TP-compatible interface. The communication module is configured to receive and pass on a token and is configured further to send unrequested data via the BACnet MS/TP-compatible interface only when the device has the token. The communication module is configured, furthermore, to pass on the token at the latest after a maximum holding time; to analyze data traffic that can be monitored at the BACnet MS/TP-compatible interface during a first time interval; and to adjust the maximum token holding time based on the analysis of the data traffic during the first time interval. The communication module is configured further to determine, in the analysis of the data traffic during the first time interval, a data transmission pattern of a device (for example, the second bus participant) reachable during operation via the BACnet MS/TP-compatible interface, whereby the data transmission pattern of the device, reachable via the BACnet MS/TP-compatible interface, is defined by a volume of transmitted data and its distribution over time.

As stated above, the data traffic analysis at runtime makes it possible to determine a data transmission pattern of one or more devices that access the bus during operation, for example, by determining a functionality of a device which gives reason to expect a specific data transmission pattern. Furthermore, as stated above, a data transmission pattern of the device can be determined by filtering the data traffic during the first time interval by data that were transmitted by the device and determining a cyclic behavior of the second bus participant with use of the filtered data.

The communication module can be configured further to determine a maximum send buffer usage of the communication module during the first time interval and further to determine whether the maximum send buffer usage of the communication module exceeds a predefined threshold value and, if the determined maximum send buffer usage of the communication module exceeds a predefined threshold value, to increase the maximum token holding time of the communication module, whereby the extent of the increase depends on the data transmission pattern of the device reachable during operation via the BACnet MS/TP-compatible interface.

If the maximum send buffer usage of the device during the first time interval exceeds a predefined threshold value, for example, if during the first time interval a send buffer usage of a communication module of more than 80% or more than 90% occurs, it can be desirable to increase the maximum token holding time so as to enable the device to send more data via the bus and thereby to reduce the amount of data present in the send buffer of the communication module. To prevent that an increase in the maximum token holding time of the device reduces to an undesirably great extent the data transmission rate of the device, also accessing the bus during operation, the data transmission pattern of the device can be analyzed to estimate how greatly the data transmission rate of the device is reduced by an increase in the maximum token holding time of the device.

The communication module can be configured, further, in addition to the analysis of the data traffic during the first time interval and the adjustment, based thereupon, of the maximum token holding time, to determine by monitoring data traffic that can be monitored at the BACnet MS/TP-compatible interface during operation, whether a further device, not previously reachable, is reachable via the BACnet MS/TP-compatible interface and, if the further device is reachable, to reduce the maximum token holding time of the communication module, whereby the extent of the reduction of the maximum token holding time is based on an analysis of the data traffic during a second time interval, whereby the analysis of the data traffic during the second time interval comprises determining a data transmission pattern of the further device, whereby the data transmission pattern of the further device is defined by a measured data transmission volume of the further device and its distribution over time.

By recognizing newly added bus participants, a process is therefore initiated whose goal is to limit the increase in the maximum token rotation time, said increase resulting from the addition of new bus participants, by checking which bus resources the new bus participant claims for itself and to what extent the device can provide at least one part of these claimed resources. If, for example, the device reaches a high send buffer usage only rarely, it can be possible to reduce the maximum token holding time, without causing the send buffer to overflow. Further, a data traffic analysis can reveal that the device and the further device transmit in different token rotations, so that a reduction of the maximum token holding time of the communication module is necessary only to a limited extent.

The communication module can be configured further to measure a token rotation time within the scope of the analysis of the data traffic during the second time interval and to determine whether the measured token rotation time exceeds a threshold value, whereby the extent of the maximum token holding time reduction is based further on whether the measured token rotation time exceeds the threshold value.

In this case, it can be provided to reduce the maximum token holding time of the communication module in particular when the measured token rotation time exceeds a threshold value. This can be useful, for example, when the data traffic via the bus concerns a non-time-critical communication between bus participants, in which lengthening of the token rotation time causes a gradual worsening of the services provided by the bus participants, which is perceived as disruptive only or particularly when the token rotation time exceeds the threshold value.

The communication module can be configured, further, within the scope of the analysis of the data traffic during the second time interval to determine transmission portions in the communication module of the measured token rotation time and to determine whether the transmission portion of the communication module has exceeded a predefined threshold value, whereby the extent of the maximum token holding time reduction is based further on whether the transmission portion of the communication module has exceeded the predefined threshold value.

For example, it can be established that the device may claim for itself no more than double the token rotation time divided by the number of bus participants. This can prevent that the transmission portions are distributed too nonuniformly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
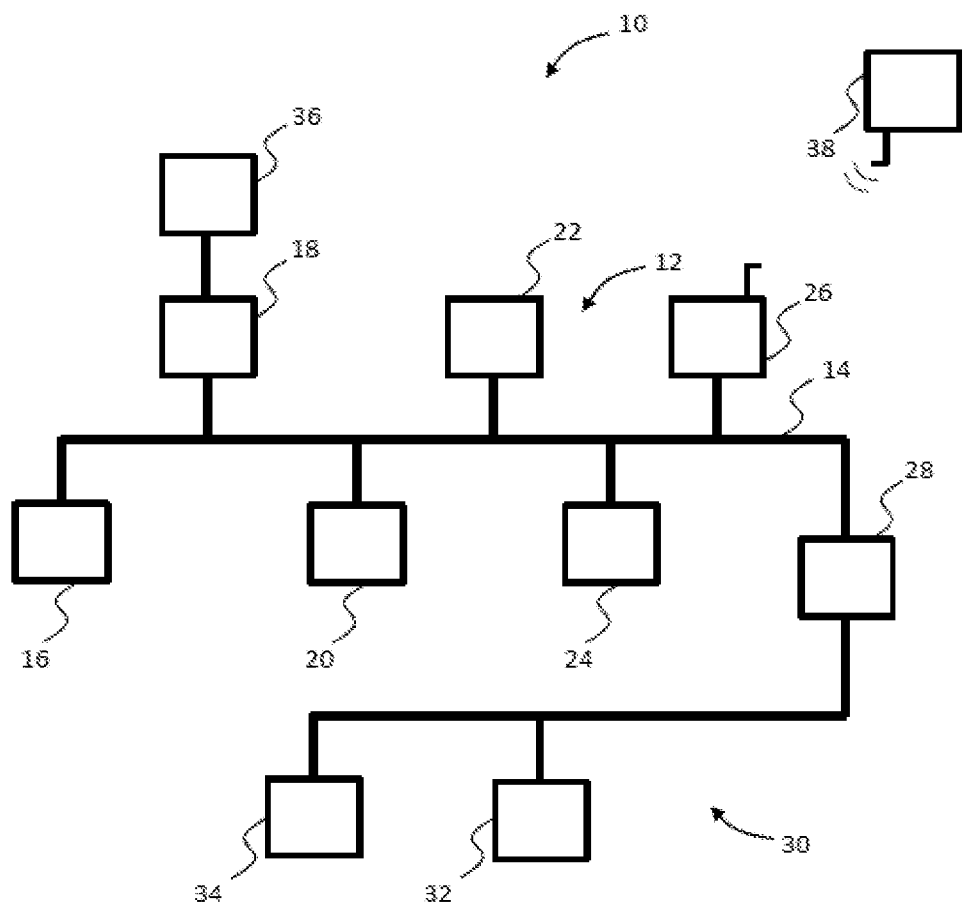
FIG. 1 shows a schematic view of a network environment, comprising a BACnet MS/TP bus system.

FIG. 1 shows a schematic view of a network environment 10, comprising a BACnet MS/TP bus system 12. BACnet MS/TP bus system 12 comprises a bus line 14 (two-wire bus) to which a plurality of bus participants 16-28 are connected. Bus participants 16-28 in operation are divided into master bus participants 16, 22, and 28 and slave bus participants 18 and 26. Further, one or more bus participants 20 and 24, which are provided to be integrated as master bus participants into the token rotation among master bus participants 16, 22, and 28, can be connected (physically) to the bus line. Before bus participants 20 and 24 are integrated as master bus participants into the token rotation, however, they are only authorized to respond to queries from master bus participants 16, 22, and 28. In contrast, they are not authorized, without responding to a query from a master bus participant 16, 22, or 28, to transmit messages to the other bus participants 16, 18, 22, 26, and 28 via the bus, i.e., with use of bus line 14. Bus participants 20 and 24 to be integrated into the token rotation are therefore the same as slave bus participants 18 and 26, but they differ from these, because they are configured to be integrated into the token rotation of the BACnet MS/TP bus system 12 as master bus participants at runtime.

Bus participants 16-28 can be freely programmable and be configured in particular to implement one or more building automation applications, i.e., to store instructions the execution of which at runtime provides or supports one or more automation applications in one or more buildings or in one or more rooms of a building. For example, master bus participant 16 can implement a first building automation control and master bus participant 22 a second building automation control. The first building automation control can be, for example, a heating and ventilation control, which controls the heating and cooling elements in a room of a building and a branch of a ventilation unit of the building, which supplies the room with fresh air and removes exhaust air. The second building automation control can be a light control, for example, which controls lighting elements in the room.

Master bus participant 28 further can implement a router, which connects BACnet MS/TP bus system 12 to a network 30. Network 30 can be, for example, a further building automation network, in particular a further BACnet MS/TP network, a BACnet PTP network, a BACnet ARCNET network, a BACnet/LonTalk network, a BACnet/ZigBee network, a BACnet Ethernet network, or a BACnet/IP network. Network 30 furthermore can comprise a (central) building control device 32, which enables monitoring and/or configuration of bus participants 16-28. Building control device 32 can store and/or retrieve in particular one or more (dynamic) HTML pages, via which parameters of bus participant 16-28 can be retrieved and optionally set. Furthermore, building control device 32 can be a portable computer, which is temporarily connected via the router to BACnet MS/TP bus system 12, for example, for the purposes of configuration or maintenance. Further, the further network 30 can comprise a further router 34, which is configured to connect central building control device 32 to a LAN (Local Area Network), a WAN (Wide Area Network), or the Internet. In particular in the case that building control device 32 is a portable computer, the further router 34 can be reached via a wireless interface.

Slave bus participants 18 and 26 can be configured to provide data to master bus participants 16, 22, and 28. For example, slave bus participants 18 and 26 can implement measuring devices, whose measured values can be queried by master bus participants 16, 22, and 28 cyclically or acyclically. For example, slave bus participant 18 can implement a temperature measuring device, which measures temperature data in regard to a room by means of a temperature sensor 36, coupled to the temperature measuring device and located in the room, and makes these available to the first building automation control. Slave bus participant 26 moreover can comprise a receiver module which is configured to receive signals wirelessly from a sensor 38. Sensor 38 can be a motion sensor, for example, which detects whether there are persons in the room. Alternatively, sensor 38 can be, for example, a sensor that detects whether a window or a door of the room is open. The data collected by slave bus participant 26 can be made available to the first building automation control and optionally the second building automation control.

Bus participant 20, to be integrated as a master bus participant in the token rotation occurring among master bus participants 16, 22, and 28, can be configured to support a building automation control implemented by master bus participants 16 and 22 or to implement a third building automation control. For example, bus participant 20 can implement a further light control that is provided to control further light elements in the room. Bus participant 24, to be integrated as a master bus participant in the token rotation occurring among master bus participants 16, 22, and 28, can also be configured to support a building automation control implemented by master bus participants 16 and 22 or to implement a fourth building automation control. For example, bus participant 24 can implement a control that is configured to control shading elements. The shading elements can be provided in particular to limit the incidence of daylight in the room.

Figure 2:
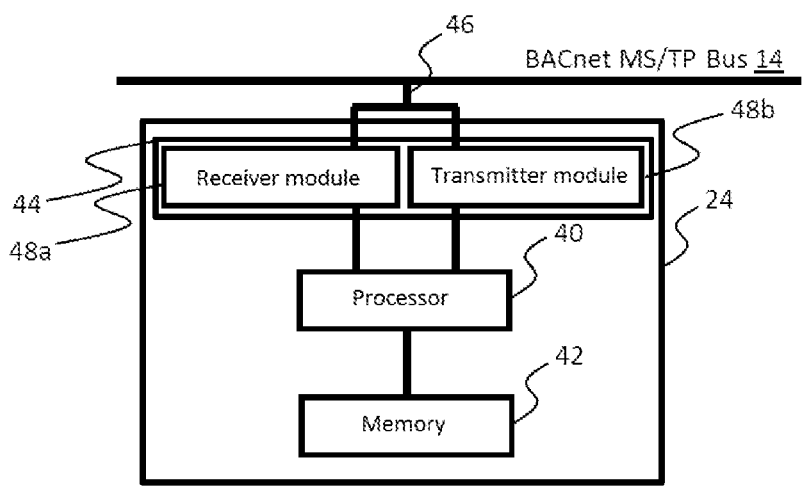
FIG. 2 shows a schematic view of a bus participant in the BACnet MS/TP bus system.

As shown in FIG. 2, bus participant 24 comprises a processor 40, a nonvolatile memory 42 coupled to processor 40, which is configured to store data and machine-readable instructions, and a communication module 44, which is configured to access an interface 46, which is in electrical contact with bus line 14. Interface 46 can be, for example, an RS-485 interface. Communication module 44 can comprise a receiver module 48*a* and a transmitter module 48*b*. Receiver module 48*a* can be configured to receive signals transmitted via bus line 14 and to provide them to processor 40. Transmitter module 48*b* can be configured to transmit signals via bus line 14 to bus participants 16-22, 26, and 28 (connected to the bus line).

Receiver module 48*a* and transmitter module 48*b* can be configured to enable parallel writing of data to the bus and reading of data from the bus. In particular, receiver module 48*a* can be configured to detect a voltage level on bus line 14, whereas transmitter module 48*b* changes the voltage level on bus line 14 or attempts to actively influence the voltage level. The presence of receiver and transmitter modules 44 and 46, operable in parallel, makes it possible for bus participant 24 in particular to check whether the data it transmitted via the bus are faulty or whether a plurality of bus participants 16-28 simultaneously transmitted different data via the bus.

Bus participant 20, like bus participant 24, can comprise a communication module 44 with receiver and transmitter modules 48*a* and 48*b*, operable in parallel, and thereby be capable of writing data to the bus and simultaneously reading data from the bus. Further, master bus participants 16, 22, and 28 can also be configured to write data to the bus in a parallel manner and simultaneously to read data from the bus. Alternatively, bus participant 20 can comprise a communication module with receiver and transmitter modules that are operable consecutively and are configured alternately either to write data to the bus or to read data from the bus. Further, master bus participants 16, 22, and 28 can also be configured alternatively either to write data to the bus or to read data from the bus.

Figure 3:
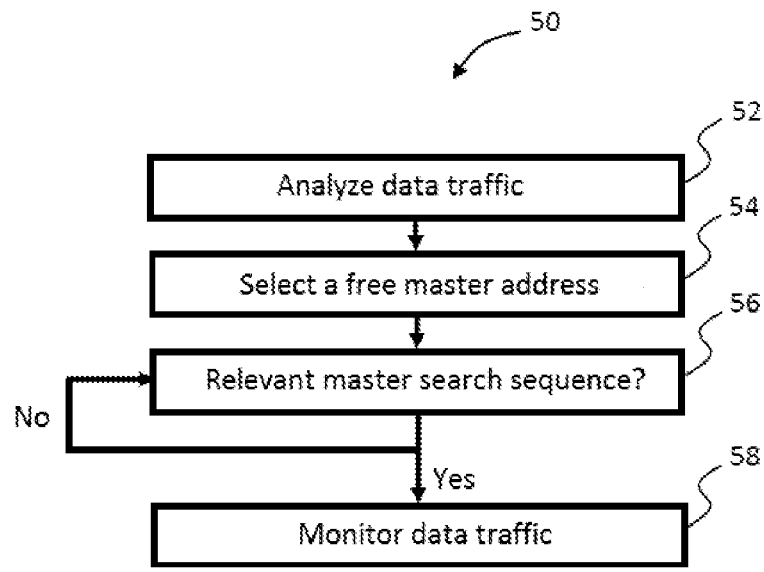
FIG. 3 shows a flowchart of a process for the automatic assignment of master addresses in the BACnet MS/TP bus system.

Memory 42 of bus participant 24 furthermore can comprise instructions to program bus participant 24 during the execution of the instructions to select a master address automatically and to strive for inclusion in the bus as a master bus participant. Process 50, initiated by the instructions stored in memory 42, for the automatic setting of a master address is shown in FIG. 3 in the form of a flowchart. Process 50 begins with process step 52, which comprises the analysis of data traffic on bus line 14. For example, the monitored data traffic can be analyzed continuously with respect to occupied master addresses. The analysis in this regard can extend over one or more communication rounds, whereby a communication round comprises a completely rotation of the token over all master addresses assigned at this time (also called token rotation herein). The analysis makes it possible for bus participant 24, striving to be integrated into the token rotation, to determine which master addresses are assigned and which master addresses are still free.

In process step 54 bus participant 24, striving to be integrated into the token rotation, selects an unoccupied preliminary master address, so as to claim it in the next corresponding master search sequence and to be integrated into the bus as a master bus participant. To prevent that the selected master address is in fact free but is in an address range that is not to be used, bus participant 24 can be programmed to select an unoccupied master address that is smaller than the (numerically) highest used master address or is greater by one than the (numerically) highest used master address. If a number of unoccupied master addresses are available that are smaller than the (numerically) highest used master address, the preliminary master address can be selected by a random function. The random function can use as a parameter a unique device address of bus participant 24 or a time of the activation of bus participant 24.

In process steps 56, the start of the next relevant master search sequence is awaited, i.e., the master search sequence that queries the master address, selected by bus participant 24 striving to be integrated into the token rotation, in regard to bus participants desiring to join the bus system. A relevant master search sequence, therefore, is a master search sequence which is initiated by a master bus participant whose master address from the set of the assigned master addresses is closest to the selected master address in the downwards direction (numerically), for example, master bus participant 28, and in which the inquiry is made about bus participants that claim the selected master address for themselves. In the case that there are a plurality of free master addresses between the assigned master address, closest to the selected master address in the downwards direction (numerically), and the assigned master address, closest to the selected master address in the upwards direction (numerically), the master search sequence can be divided into a number of parts, namely, when no bus participant claims the first queried master address for itself and the master bus participant initiating the master search sequence successively searches one or more further master addresses, until a free master address is (successfully) claimed by a bus participant, or the address space to be searched was unsuccessfully searched, and the master search sequence is ended.

After the start of the next relevant master search sequence is determined, process 50 is continued with process step 58, which comprises the monitoring of the data traffic during a reply phase of the master search sequence with respect to the bus participants responding to the master search sequence. In this regard, a number of different circumstances can occur. If bus participant 24 is the only bus participant, claiming the selected master address for itself in the reply phase, thus in the monitoring of the data traffic during the reply phase no (reply) activities of other bus participant, for example, bus participants 16-22 and 26, are noted and accordingly a conflict-free assignment of the selected master address is assumed. Because the thereby successfully assigned master address from now on is no longer queried in any master search sequence, no other bus participant can also successfully claim it for itself.

If apart from bus participant 24 there still are one or more other bus participants, such as, for example, bus participant 20, which in the reply phase claims the selected master address for itself, bus participant 24 can be configured to recognize the latent address conflict case arising therefrom and to resolve it if possible. For example, bus participant 24 can be configured to cancel a planned reply to the master search sequence, if during monitoring of the data traffic it is determined during the reply phase by analyzing the data traffic that a further bus participant, for example, bus participant 20, claims the selected master address for itself.

Further, bus participant 24 striving for integration into the token rotation can be configured to terminate an already started reply to the master search sequence, if during monitoring of the data traffic it is determined during the reply to the master search sequence by analyzing the data traffic that a further bus participant, such as, for example, bus participant 20, claims the selected master address for itself. If further bus participant 20 is capable of writing data to the bus and simultaneously to read data from the bus, further bus participant 20 can also be configured further to terminate an already started reply to the master search sequence, if during the monitoring of the data traffic it is determined during the reply to the master search sequence by analyzing the data traffic that bus participant 24 claims the selected master address for itself. Because in this case both bus participants, or in the case of a plurality of similarly programmed and acting bus participants, these terminate the started reply to the master search sequence, it can occur that the master address is not assigned in the current master search sequence.

To prevent the similarly programmed and acting bus participants from continuing to interfere or from interfering in the following master search sequences, some or all of the bus participants can be configured to select different time intervals after which they repeat the replying to the master search sequence. For example, bus participant 24, striving for integration into the token rotation, can be configured to determine a time interval after which replying to the master search sequence or subsequent master search sequences can occur by a random process or an indicator randomly assigned to bus participant 24. The random process can be based, for example, on parameters that are determined at runtime and the granularity of which is great enough to result in different time intervals with a high probability, for example, in more than 99.99% of the arising cases. Similarly, further bus participant 20 or, in the case of a plurality of further bus participants, all other bus participants can be configured to determine a time interval, after which replying to the master search sequence or subsequent master search sequences can occur, by a random method or an indicator or indicators randomly assigned to further bus participant 20 or to the plurality of further bus participants, whereby, for example, all randomly assigned indicators are different and thereby unique.

Further, bus participant 24 can be configured not to set the selected master address and instead to select an alternative master address, if during the monitoring of data traffic it is determined during the reply phase of the master search sequence by analyzing the data traffic that further bus participant 20 also claims said master address for itself, although bus participant 24 had already claimed the master address for itself; i.e., the replying to the query has been completed. Further, bus participant 24, striving for integration into the token rotation, can be configured not to use a set master address and instead to select an alternative master address, if during the (continuous) monitoring of the data traffic it is determined after the end of the reply phase of the master search sequence by analyzing the data traffic that further bus participant 20 uses the master address of bus participant 24. It is made possible thereby to prevent or resolve address conflicts, even if further bus participant 20 is not capable of writing data to the bus and simultaneously reading data from the bus and therefore cannot recognize the latent address conflict.

Figure 4:
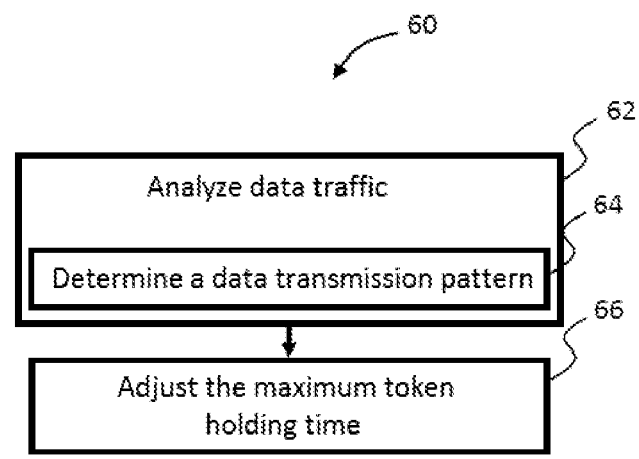
FIG. 4 shows a flowchart of a process for the automatic adjustment of the maximum token holding time of a bus participant in the BACnet MS/TP bus system.

Memory 42 of bus participant 24 can comprise furthermore instructions that program bus participant 24 during the execution of the instructions to automatically adjust the maximum token holding time. Process 60, initiated by the instructions stored in memory 42, for the automatic adjustment of a maximum token holding time is shown in FIG. 4 in the form of a flowchart. Process 60 begins with process step 62, which comprises analyzing the data traffic in BACnet MS/TP bus system 12. For example, the data traffic can be analyzed during two, three, four, five, or n token rotations (with n being greater than 5). The analysis can be focused on determining whether master bus participants 16, 22, and 28 in each token rotation send (useful) data, i.e., data going beyond the bus communication stipulated by the BACnet MS/TP protocol, or whether there is one or more token rotations in which a bus participant sends no (useful) data. Further, the analysis can be focused on determining whether one, several, or all of the master bus participants 16, 22, and 28 in each token rotation send (virtually) the same amount of (useful) data via the bus, or whether the amount of (useful) data in the token rotations varies around an average (by more than a predefined deviation factor).

Furthermore, the analysis can be focused on determining which building automation application(s) or which type(s) of building automation application(s) master bus participants 16, 22, and 28 are implementing. To this end, for example, bus participant 24 can be configured to query master bus participants 16, 22, and 28 about the building automation application(s) implemented by them. Moreover, the analysis can be focused on determining how time critical the building automation application(s) implemented by master bus participants 16, 22, and 28 is/are. In this case, this information can be queried directly from master bus participants 16, 22, and 28 or can be estimated in regard to the type(s) of the implemented building automation application (s). For example, bus participant 24 can store information that permits assigning maximum token rotation times to a plurality of building automation application types.

In process step 64, the analysis with the determination of a data transmission pattern of at least one of master bus participants 16, 22, and 28 is continued. Regarded as a data transmission pattern in this regard is in particular a data transmission behavior from which conclusions can be drawn on a future data transmission behavior. If the data transmission behavior comprises a cyclic component, for example, transmission of the same data amount in each second, third, fourth, fifth, or n-th token rotation (with n being greater than 5), this can be interpreted as part of a data transmission pattern such that the same data amount is transmitted in the future as well in each second, third, fourth, fifth, or n-th token rotation. The data transmission pattern is therefore based on rules which are obtained by analyzing the data traffic and from which a future data transmission behavior can be deduced. A cyclic behavior of master bus participant 16 can be determined, for example, by a Fourier analysis of the data traffic filtered by master bus participant 16.

In process step 66, the maximum token holding time of bus participant 24 is adjusted based on the data traffic analysis. If, for example, all or a plurality of master bus participants 16, 22, and 28 transmit (useful) data only in each second, third, fourth, fifth, or n-th token rotation (with n being greater than 5), it can be concluded from this that an increase in the token rotation time will not affect or at most slightly affect these master bus participants 16, 22, and 28. If, in contrast, all or the plurality of master bus participants 16, 22, and 28 transmit in each token rotation, it can be concluded from this that an increase in the token rotation time will directly affect these master bus participants 16, 22, and 28. Bus participant 24 in this case can be configured further to undertake an increase in the maximum token holding time of bus participant 24 in particular only if the maximum (i.e., the maximum measured) send buffer usage of transmitter module 48b exceeds a predefined threshold value in the token rotations analyzed with respect to the data traffic.

It can be established further that a greater increase in the maximum token holding time can be made in the first case than in the second case. For example, it can be established that the increase in the first case is less than 10% or less than 5% of the maximum token holding time and in the second case is more than 10% or more than 20% of the maximum token holding time. Furthermore, bus participant 24 can be configured to reduce the maximum token holding time of bus participant 24 in the case in which the maximum send buffer usage of transmitter module 48b in the token rotations analyzed with respect to data traffic does not exceed a predefined threshold value or fall below another threshold value. Bus participant 24 can be configured further to reduce the maximum token holding time of bus participant 24 in this case, in particular only if a plurality or all of the master bus participants 16, 22, and 28 transmit (useful) data in all token rotations.

Process 60 can be repeated further iteratively, if the data traffic analysis reveals that the data transmission pattern of one or more of master bus participants 16, 22, and 28 changes structurally, for example, if the one master bus participant or the plurality of master bus participants 16, 22, and 28 transmits in additional token rotations or if the one master bus participant or the plurality of master bus participants 16, 22, and 28 transmits in fewer token rotations, whereby an increase or decrease in the maximum token holding time of bus participant 24 can be smaller in value from repetition to repetition in order to achieve a convergence of the maximum token holding time to a certain value. Further, a repetition of processes 60 can be related to the fact that master bus participants 16, 22, and 28 are removed from the bus or integrated into the bus. Moreover, the adjustment of the maximum token holding time of bus participant 24 can occur according to Fairness standpoints, whereby a transmission portion of bus participant 24 and optionally transmission portions of master bus participants 16, 22, and 28 are determined and the maximum token holding time of bus participant 24 is reduced, if the transmission portion of bus participant 24 exceeds a predefined threshold value, and the transmission portion of bus participant 24 is increased, if the transmission portion of bus participant 24 falls below a predefined threshold value, or if a comparison of the transmission portions of bus participant 24 and master bus participants 16, 22, and 28 reveals that the maximum token holding time of bus participant 24 deviates from the maximum token holding times of master bus participants 16, 22, and 28 in each case by more than a predetermined threshold value.

The degree of adjustment can be based further on the send buffer usage of transmitter module 48b in the token rotations analyzed with respect to data traffic. If, for example, the maximum send buffer usage of transmitter module 48b exceeds a predefined threshold value, such as, e.g., 80% or 90% of the maximum (i.e., the maximum possible) send buffer usage, thus bus participant 24 can be configured to strive for an increase in the maximum token holding time of bus participant 24, whereby it can be established that the increase is the greater, the more greatly the maximum send buffer usage of transmitter module 48b exceeds the predefined threshold value. If, in contrast, the maximum send buffer usage of transmitter module 48b falls below a predefined threshold value, such as, e.g., 20% or 10% of the maximum send buffer usage, thus bus participant 24 can be configured to strive for a reduction in the maximum token holding time of bus participant 24, whereby it can be established that the reduction is the greater, the more greatly the maximum send buffer usage of transmitter module 48b falls below the predefined threshold value.

Figure 5:
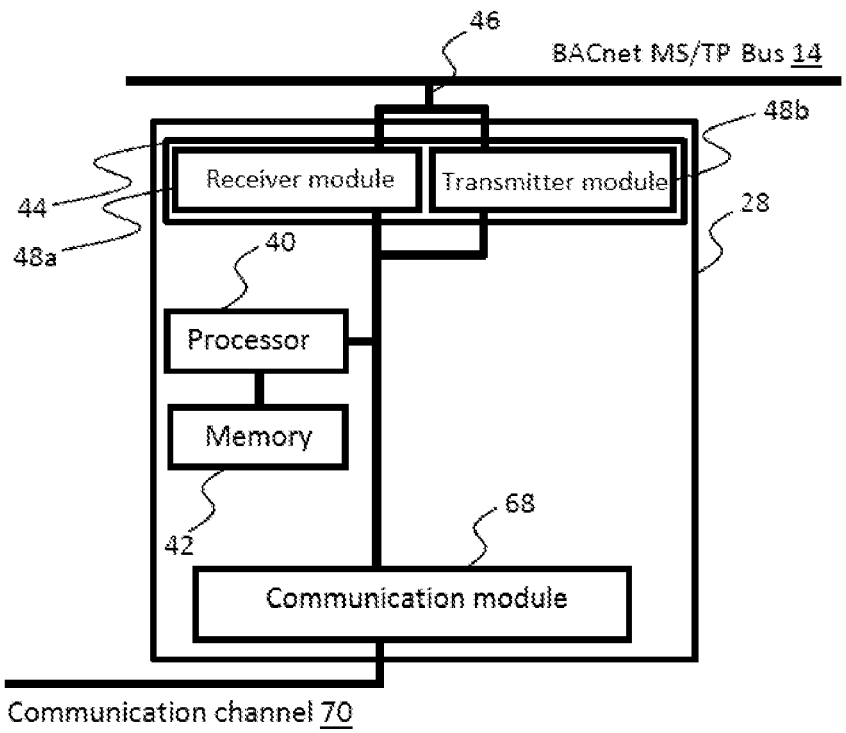
FIG. 5 shows a schematic view of a further bus participant in the BACnet MS/TP bus system.

FIG. 5 shows a schematic view of master bus participant 28 in an exemplary embodiment in which master bus participant 28 implements a router. As shown in FIG. 5, master bus participant 28 comprises a processor 40 and a nonvolatile memory 42, which is coupled to processor 40 and is configured to store data and machine-readable instructions. Nonvolatile memory 42 can store in particular instructions that program bus participant 28 in the execution of the instructions to implement processes 50 and 60 described in connection with FIGS. 3 and 4. Master bus participant 28 comprises further a communication module 44, which is configured to access a (physical) interface 46, which is in electrical contact with bus line 14. Interface 46 can be, for example, an RS-485 interface. Communication module 44 can comprise further receiver module 48a described in relation to FIG. 2 and transmitter module 48b described in relation to FIG. 2. Master bus participant 28, moreover, can comprise a further communication module 68, which is configured to access a further (physical) interface which is in electrical contact with a communication channel 70. The further communication module 68 can be configured to receive signals transmitted via communication channel 70 (and to provide them to processor 40) and to transmit signals via communication channel 70. Furthermore, further communication module 68 can be configured to pass on the data, received via communication channel 70 connected to the interface, to communication module 44, which can be configured to transmit data received from further communication module 68 via interface 46. Furthermore, communication module 44 can be configured to pass on data, received via interface 46, to further communication module 68, which can be configured to transmit data, received from communication module 44, via the further interface. In this case, the router enables data communication between the BACnet MS/TP bus system 12 and network 30.

Figure 6:
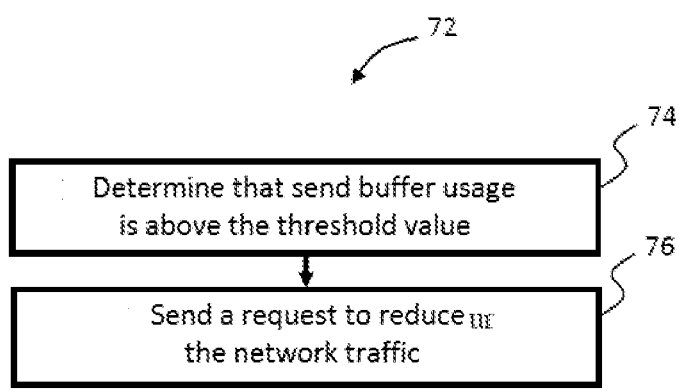
FIG. 6 shows a flowchart of a process for the automatic adjustment of the data traffic in the BACnet MS/TP bus system.

Memory 42 of master bus participant 28 furthermore can comprise instructions, which program master bus participant 28 in the execution of the instructions to initiate an automatic adjustment of the data traffic in the BACnet MS/TP bus system 12. Process 72, initiated by the instructions stored in memory 42, for the automatic adjustment of the data traffic is shown in FIG. 6 in the form of a flowchart. Process 72 begins with process step 74, in which master bus participant 28 during runtime determines that usage of the send buffer of the router, implemented in master bus participant 28, exceeds a predefined threshold value. After determining that the send buffer usage exceeds a predefined threshold value, process 72 is continued with process step 76 in which master bus participant 28 sends a message to at least one further master bus participant 16 and 22, whereby the message contains a request to reduce the amount of data sent via the BACnet MS/TP bus system 12. For example, master bus participant 28 can send a first message to the address of master bus participant 16 and a second message to the address of master bus participant 22. Alternatively, a master bus participant 16 and 28 or master bus participants 16 and 28 can be configured to check messages sent via the bus, even if they are not explicitly addressed to master bus participants 16 and 28, as to whether they contain a request to reduce the amount of data sent via the BACnet MS/TP bus system 12. For example, one of the master bus participants 16 and 28 or master bus participants 16 and 28 can be configured to check messages sent via the bus as to whether they contain a request to reduce the amount of data sent via the BACnet MS/TP bus system 12, if the messages are addressed to a predefined address.

The message can comprise an indicator of different priority levels. If the indicator is assigned, for example, to a first priority level, master bus participants 16 and 22 divide the data to be transmitted by them with respect to their priority and delay the transmission of lower priority data. If the indicator is assigned, for example, to a second higher priority level, master bus participants 16 and 22 suspend the transmission of lower priority data. If the indicator is assigned further, for example, to a third, still higher priority level, master bus participants 16 and 22 moreover suspend the transmission of useful data for a certain time period. If a token holding time flag is set in the message, master bus participants 16 and 22 reduce their maximum token holding time. If a baud rate increase flag is set in the message, master bus participants 16 and 22 increase their baud rate. If the indicator, in contrast, is assigned, for example, a fourth priority level, master bus participants 16 and 22 return to their normal (original) transmit state. Alternatively, the return to the normal transmit state can be triggered by the elapse of a time duration, whereby each priority level can be assigned a predefined time duration or a particular time duration can be contained in the message. The time duration in this case can begin with the receiving of the message and end when the time represented by the time duration has elapsed. Further, master bus participants 16 and 22 can be configured to resume the transmission of useful data on their own initiative, if the usage of their send buffer exceeds a predefined threshold value. Further, master bus participant 28 can be configured, furthermore, to lengthen its maximum token holding time. This is indicated in particular when the send buffer usage of master bus participant 28 cannot be reduced (permanently) to below a predefined threshold value by the automatic adjustment of data traffic, as described above, in the BACnet MS/TP bus system 12.

Figure 7:
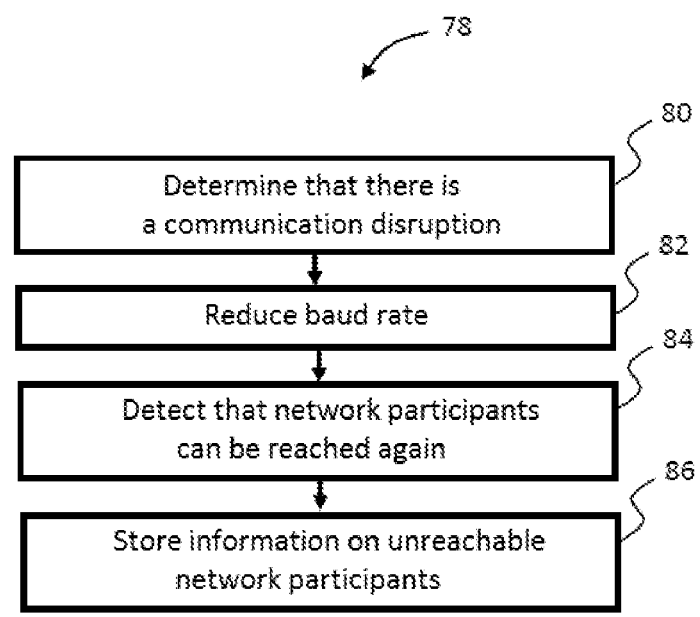
FIG. 7 shows a flowchart of a process for the automatic localization of a physical network fault.

Memory 42 of master bus participant 28, furthermore, can comprise instructions that program master bus participant 28 during the execution of the instructions to support a process 78 for localizing a physical network fault in network 30. Process 78, initiated by the instructions stored in memory 42, for localizing a physical network fault is shown in FIG. 7 in the form of a flowchart. Process 78 begins with process step 80, in which master bus participant 28 detects that a communication with building control device 32 and router 34 is disrupted. In process step 82, master bus participant 28 thereupon automatically reduces its baud rate. The susceptibility to failure of the communication is reduced by the baud rate reduction. In process step 84, master bus participant 28 detects that a connection can be established to a part of the network participants, namely, building control device 32. In process step 86, master bus participant 28 stores information in regard to network participants not reachable at the reduced baud rate, namely, further router 34.

Master bus participant 28, further, can be configured to reduce the baud rate stepwise and to try to establish a connection with further network participants 32 and 34 for each baud rate level, and to store for each baud rate information on the reachable network participants. In this case, each network participant starting from the beginning of a disruption can reduce its baud rate stepwise, whereby each network participant remains at each step for a predefined time and tries to establish a connection with all network participants, for example, by transmitting a broadcast message. Alternatively, instead of a stepwise reduction, the baud rate can be set to a minimum value and, if communication is again possible with at least some of the network participants, a request can be sent to these network participants to increase the baud rate stepwise, whereby each network participant is configured to store information on the baud rate at which communication breaks off with network participants with which a connection was still possible at a lower baud rate. Furthermore or alternatively, the information can contain a fault rate from which the degree of communication disruption to each network participant is evident.

Similarly, building control device 32 can be configured likewise to implement process 78. Further, building control device 32 can be configured to receive the information of master bus participant 28 on unreachable router 34 with use of the reduced baud rate. Further, building control device 32 can be configured to create a reachability chart based on the received and stored information. The reachability chart can show in particular graphically over which network connection and at which baud rate a connection between network participants was possible and thereby supports the localization of the physical network fault. For example, building control device 32 can comprise an analysis unit, which is configured to receive information on unreachable network participants from all network participants involved in the process and, for example, to represent this graphically in the form of a reachability chart for each baud rate.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for an automatic adjustment of a maximum token holding time of a first bus participant in a BACnet MS/TP bus system, the method comprising:
    analyzing, by the first bus participant, a data traffic in the bus system during a first time interval; and
    adjusting, by the first bus participant, the maximum token holding time of the first bus participant based on an analysis of the data traffic during the first time interval,
    wherein the analysis of the data traffic during the first time interval comprises determining a data transmission pattern of a second bus participant, and
    wherein the data transmission pattern of the second bus participant is defined by a measured data transmission volume of the second bus participant and a distribution of the measured data transmission volume of the second bus participant over time.

2. The method according to claim 1, wherein the analysis of the data traffic during the first time interval further comprises:
    determining a maximum send buffer usage of the first bus participant during the first time interval;
    determining whether the maximum send buffer usage of the first bus participant exceeds a predefined threshold value; and
    increasing the maximum token holding time of the first bus participant if the maximum send buffer usage of the first bus participant exceeds the predefined threshold value,
    wherein an extent of an increase of the maximum token holding time of the first bus participant is determined as a function of the data transmission pattern of the second bus participant.

3. The method according to claim 1 further comprising, in addition to the analysis of the data traffic during the first time interval and an adjustment, based thereupon, of the maximum token holding time:
    determining whether a third bus participant was added to the bus system; and
    reducing the maximum token holding time of the first bus participant if the third bus participant was added to the bus system,
    wherein an extent of a reduction in the maximum token holding time is based on an analysis of the data traffic during a second time interval, and
    wherein the analysis of the data traffic during the second time interval comprises determining a data transmission pattern of the third bus participant and the data transmission pattern of the third bus participant is defined by a measured data transmission volume of the third bus participant and a distribution of the measured data transmission volume of the second bus participant over time.

4. The method according to claim 3, wherein the analysis of the data traffic during the second time interval comprises:
    measuring a token rotation time; and
    determining whether the token rotation time exceeds a second threshold value,
    wherein the extent of the reduction in the maximum token holding time is based further on whether the token rotation time exceeds the second threshold value.

5. The method according to claim 3, wherein the analysis of the data traffic during the second time interval comprises:
    determining a transmission portion of the first bus participant in the token rotation time; and
    determining whether the transmission portion of the first bus participant has exceeded a predefined third threshold value,
    wherein the extent of the reduction in the maximum token holding time is based further on whether the transmission portion of the first bus participant has exceeded the predefined third threshold value.

6. A device comprising:
    a BACnet MS/TP-compatible interface; and
    a bus participant for transmitting and receiving data via the BACnet MS/TP-compatible interface, the bus participant being configured to receive and pass on a token and is further configured:
    to send unrequested data via the BACnet MS/TP-compatible interface only when the device has the token;
    to pass on the token at the latest after a maximum holding time;
    to analyze a data traffic that can be monitored at the BACnet MS/TP-compatible interface during a first time interval;
    to adjust the maximum token holding time based on an analysis of the data traffic during the first time interval; and
    to determine, in the analysis of the data traffic during the first time interval, a data transmission pattern of a device reachable during operation via the BACnet MS/TP-compatible interface,
    wherein the data transmission pattern of the device reachable via the BACnet MS/TP-compatible interface is defined by a volume of transmitted data and by a distribution over time of the volume of the transmitted data.

7. The device according to claim 6, wherein the bus participant is configured:

to determine a maximum send buffer usage of the bus participant during the first time interval;

to determine whether the maximum send buffer usage of the bus participant exceeds a predefined threshold value; and to increase, if the determined maximum send buffer usage of the bus participant exceeds the predefined threshold value, the maximum token holding time of the bus participant, wherein an extent of an increase of the maximum token holding time of the bus participant depends on the data transmission pattern of the device reachable during operation via the BACnet MS/TP-compatible interface.

8. The device according to claim 6, wherein the bus participant is configured further, in addition to the analysis of the data traffic during the first time interval and an adjustment, based thereupon, of the maximum token holding time:

to determine, by monitoring the data traffic that can be monitored at the BACnet MS/TP-compatible interface during operation, whether a further device previously not reachable, is reachable via the BACnet MS/TP-compatible interface; and to reduce, if the further device is reachable, the maximum token holding time of the bus participant, wherein an extent of the maximum token holding time reduction is based on an analysis of the data traffic during a second time interval, wherein the analysis of the data traffic during the second time interval comprises determining a data transmission pattern of the further device, and wherein the data transmission pattern of the further device is defined by a measured data transmission volume of the further device and a distribution of the measured data transmission volume of the further device over time.

9. The device according to claim 8, wherein the bus participant is configured further, within a scope of the analysis of the data traffic during the second time interval:

to measure a token rotation time; and to determine whether the token rotation time exceeds a second threshold value, wherein the extent of the maximum token holding time reduction is further based on whether the token rotation time exceeds the second threshold value.

10. The device according to claim 8, wherein the bus participant is configured further, within the scope of the analysis of the data traffic during the second time interval:

to determine a transmission portion of the bus participant in the token rotation time; and to determine whether the transmission portion of the bus participant has exceeded a predefined third threshold value, wherein the extent of the maximum token holding time reduction is further based on whether the transmission portion of the bus participant has exceeded the third threshold value.

* * * * *